United States Patent [19]

Frazee

[11] Patent Number: 4,879,333
[45] Date of Patent: Nov. 7, 1989

[54] AQUEOUS PRESSURE SENSITIVE ADHESIVE COMPOSITIONS

[75] Inventor: Glenn R. Frazee, Kenosha, Wis.

[73] Assignee: S. C. Johnson & Son, Inc., Racine, Wis.

[21] Appl. No.: 316,268

[22] Filed: Feb. 24, 1989

Related U.S. Application Data

[63] Continuation-in-part of Ser. No. 302,050, Jan. 25, 1989, abandoned, which is a continuation-in-part of Ser. No. 125,313, Nov. 25, 1987, abandoned, which is a continuation of Ser. No. 905,593, Sep. 9, 1986, abandoned.

[51] Int. Cl.$^4$ .............................. C08F 2/16; C08K 3/20
[52] U.S. Cl. .................................... 524/460; 524/457; 524/458
[58] Field of Search ............... 524/556, 460, 457, 458; 526/203, 323; 427/208.4

[56] References Cited

U.S. PATENT DOCUMENTS

| | | | |
|---|---|---|---|
| 3,784,498 | 1/1974 | Ceska | 524/819 |
| 4,071,391 | 1/1978 | Haberstroh et al. | 428/461 |
| 4,172,122 | 10/1979 | Kubik et al. | 524/556 |
| 4,373,077 | 2/1983 | Boeder | 526/219 |
| 4,414,370 | 11/1983 | Hamielec et al. | 526/88 |
| 4,529,787 | 7/1985 | Schmidt et al. | 526/329.2 |
| 4,546,160 | 10/1985 | Brand et al. | 526/317.1 |
| 4,668,730 | 5/1987 | Iovine et al. | 524/460 |

FOREIGN PATENT DOCUMENTS 47-606  1/1972  Japan.

OTHER PUBLICATIONS

Advances in Chemistry Series 125—ACS, (1973), Washington, D.C. by Nakajima, pp. 98-107.

*Primary Examiner*—Joseph L. Schofer
*Assistant Examiner*—N. Sarofim

[57] ABSTRACT

An improved emulsion pressure sensitive adhesive composition is disclosed. The pressure sensitive adhesive composition is formed by emulsion polymerization of vinylic monomers in the presence of a support resin which is added after the polymerization of the monomers has begun.

37 Claims, No Drawings

4,879,333

AQUEOUS PRESSURE SENSITIVE ADHESIVE COMPOSITIONS

BACKGROUND OF INVENTION

Reference to Related Applications

This application is a continuation-in-part of patent application Ser. No. 302,050 filed Jan. 25, 1989 (now abandoned), which is a continuation-in-part of patent application Ser. No. 125,313 filed Nov. 25, 1987 (now abandoned), which, in turn, is a continuation of application Ser. No. 905,593 filed Sept. 9, 1986 (now abandoned), the benefit of which is now claimed for purposes of priority pursuant to 35 U.S.C. § 120. This application is also related to application Ser. No. 119,282 filed Nov. 4, 1987, which is a continuation of application Ser. No. 899,282 filed Aug, 22, 1986 (now abandoned).

The present invention relates to aqueous pressure sensitive adhesive compositions. In particular, an acrylic polymer emulsion is employed as the polymeric component of a pressure sensitive adhesive formulation. The aqueous acrylic polymer emulsion compositions have substantially Newtonian-like flow characteristics.

pressure sensitive adhesives (PSAs) are a class of adhesive compositions which are applied with pressure, usually finger pressure, and generally do not undergo a liquid to solid transition in order to hold materials together. PSAs can be solvent-free natural or synthetic resins having a viscoelastic property termed tack. Tack is a property characterized by the rapid wetting of a substrate by a polymer to form an adhesive bond upon brief contact with the substrate under light pressure. Typical applications for PSAs include pressure-sensitive tapes, labels, decals, decorative vinyls, laminates, wall coverings and floor tiles.

The early pressure sensitive tapes used adhesives that were based on organic solvent solutions of natural or synthetic rubber, tackified by a resinous material. Later, the rubber in pressure sensitive adhesives was replaced with styrene-butadiene block copolymers. More recently, the polyacrylates have gained wide acceptance in pressure sensitive adhesive formulations due to their clarity and resistance to oxidation and sunlight.

Acrylic copolymer PSAs are available as solution or aqueous polymer emulsions and may also be solid hot melt pressure sensitive adhesives.

The anionic and nonionic emulsifiers generally employed in acrylic emulsion polymerization protect the soft pressure sensitive polymers from impact coalescence during the reaction and stabilize the latex for satisfactory mechanical and storage stability. However, the emulsifiers do have adverse effects on pressure sensitive adhesive properties. The emulsifiers employed in emulsion polymerization adversely affect water resistance, tack and adhesion properties of polymer emulsion adhesives.

Canadian Patent No. 814,528, issued June 3, 1969, discloses low molecular weight alkali soluble resins, resin cuts and methods for their preparation and purification. The resins are disclosed as being especially useful as emulsifiers, leveling agents and film-formers. The number average molecular weight of the resins ranges from 700–5000; and the resins have acid numbers between 140 and 300. The resins are disclosed as emulsifiers in the preparation of polymer emulsions resulting in polymer emulsions which are stable and substantially free from coagulum. For use as an emulsifier in emulsion polymerization reactions, the resins must have a number average molecular weight between 1,000 and 2,000 and preferably between 1,000 and 1,600. Resins having a number average molecular weight greater than 2,000 result in unstable and coagulated polymer emulsions when used as the emulsifier in emulsion polymerization reactions.

The present invention provides advantages over known acrylic copolymer adhesives by providing improved pressure-sensitive adhesive formulations having (a) fine particle size emulsions, (b) emulsion viscosities which can be varied from low to high with no sacrifice in stability, (c) emulsion viscosities which are stable under high shear conditions encountered in roll coating operations (Newtonian-like flow characteristics) and (d) low foam production which is desirable in roll coating operations.

SUMMARY OF THE INVENTION

Briefly, in accordance with the present invention, an improved aqueous acrylic pressure sensitive adhesive is prepared by using an acrylic polymer emulsion made in the presence of a support resin. The acrylic polymer emulsion is a polymer containing one or more vinylic monomers wherein at least 40% by weight of the polymer is an alkylacrylate or alkylmethacrylate. The support resin can be any water or alkali soluble or water or alkali dispersible polymer having a number average molecular Weight of from about 1,000 to about 20,000.

Briefly, the adhesives of the present invention are prepared by adding a resin to an emulsion polymerization reaction mixture during the polymerization reaction. The resin is a low molecular weight polymer and is soluble or dispersible in water or alkali solutions. The emulsion polymerization reaction mixture contains any monomer which can be employed in emulsion polymerization reactions. The resin is added to the reaction mixture during the emulsion polymerization process, i.e., after initiation of the emulsion polymerization reaction but before the polymerization reaction is substantially completed. The resulting resin-fortified polymer emulsions possess substantially Newtonian rheological properties, improved stability and good wetting properties.

The resins are added to the emulsion polymerization reaction mixture as solutions, solids (such as flakes or granules), or as slurries (suspension of solids in water). When the resin is added as a solid, either as flakes, granules or a slurry, then an alkaline material is added to the reaction mixture in a quantity sufficient to solubilize the resin. The monomer component of the emulsion polymerization reaction can be introduced into the reaction mixture all at once or portions of the monomer component can be added to the reaction mixture at various times, i.e., multistage monomer addition. In either case, the monomers are usually added to the reaction mixture slowly over a ½ hour to 2 hour period.

The acrylic polymer emulsion prepared according to these procedures can be used neat as pressure sensitive adhesives or can be admixed with standard pressure sensitive adhesive ingredients such as dyes, preservatives, tackifiers, perfumes, coalescing solvents and leveling aids.

The acrylic pressure sensitive adhesives according to the present invention have excellent flow, coating and leveling characteristics especially on low energy surfaces and on high speed equipment. The present acrylic polymer emulsions are characterized by near Newtonian flow and are slightly translucent.

DETAILED DESCRIPTION OF INVENTION

The adhesive compositions of the present invention comprise an aqueous polymer emulsion comprising water and about 30 to 60% by weight of a polymer comprising at least one vinylic monomer wherein at least 40% of said vinylic monomer is an alkyl acrylate or an alkyl methacrylate and wherein said polymer is prepared by:
(a) polymerizing a first monomer charge comprising at least one vinylic monomer in the presence of a surfactant, and an initiator under conditions sufficient to initiate emulsion polymerization of said first monomer charge; and thereafter
(b) adding to the polymerization mixture an effective amount of at least one support resin to improve the physical characteristics of said polymer, said resin selected from the group consisting of water soluble resins, water dispersible resins, alkali soluble resins, alkali dispersible resins and mixtures thereof; said composition having a viscosity of less than about 3,500 centipoise.

When used herein the term "polymer emulsion" refers to any polymer prepared by emulsion polymerization. Such polymers are formed by the polymerization of one or more monomers capable of undergoing free radical emulsion polymerization. When used herein the term "resin" encompasses all low molecular weight polymers of from about 500 to about 20,000, and preferably about 500 to 10,000, number average molecular weight, which are soluble or dispersible in water, alkali or water in the presence of a co-solvent. Examples of suitable co-solvents include the ketones such as methylethylketone, glycols such as ethylene glycol, glycol ethers such as the ethylene glycol $C_{1-4}$ alkyl ethers, alcohols such as isopropyl alcohol, N-butyl alcohol. amides such as dimethylformamide, and pyrrolidones such as N-methyl-2-pyrrolidone.

In preparing the adhesive compositions of the present invention, an emulsion polymerization process is conducted wherein a low molecular weight resin is added to an emulsion polymerization reaction mixture during the emulsion polymerization process, The resin is added to the emulsion polymerization reaction mixture after polymerization has been initiated but before the emulsion polymerization reaction is substantially complete. The resin can be added as a solid, a solution or slurry. The monomers employed in the emulsion polymerization process can be added to the reaction mixture in a single stage or, alternatively, can be added to the reaction mixture in a multi-stage addition.

In conducting the present emulsion polymerization reaction standard emulsion polymerization techniques are employed with the exception of the in situ resin addition. Standard nonionic and anionic surfactants are employed in the process. Advantageously, the reaction can be conducted at an elevated temperature of from about 60 to about 100° C., at ambient pressure and under an inert atmosphere such as nitrogen. Also low temperature polymerization can be used with appropriate initiators such as redox initiators. The reaction mixture is maintained under agitation employing standard mixing techniques.

Before the resin is added to the emulsion polymerization reaction mixture there must be a stabilizer present in the reaction mixture to prevent coagulation of the emulsion particles. The stabilizer can be any of the conventional nonionic surfactants such as ethoxylated alkylphenols including ethoxylated nonylphenol having at least 20 ethylene oxide units, ethoxylated octylphenol having at least 20 ethylene oxide units or, alternatively, functional monomers such as acrylic acid, methacrylic acid or polyethylene glycol monomethacrylate. The stabilizer may be added to the reaction mixture prior to resin addition and usually in amounts of from about 1 to about 8 percent by weight of the reaction mixture and preferably from about 2 to about 4 weight percent.

It is also necessary to use a small percentage of at least one conventional emulsion polymerization surfactant. Acceptable surfactants are well-known to those skilled in the art of emulsion polymerization. These include nonionic surfactants such as the octyl- and nonyl-phenol ethoxylates having 15 or less moles of ethylene oxide, as well as the ethylene oxide/propylene oxide block copolymers with less than about 3.5 moles ethylene oxide and propylene oxide combined and the like and nonionic surfactants such as sodium tridecyl ether sulfonate, sodium lauryl sulfate, and the like. Only a small percentage of surfactant is necessary, on the order of about 25 to 5% by weight. It is preferred to include about 0.25 to 1.00 by weight of surfactant.

The resin is added to the emulsion polymerization reaction mixture as a solution, solid (flakes or granules) or as a slurry. If the resin is added as a solid, then a sufficient amount of alkaline material must be added to the reaction mixture in order to solubilize the resin. The method of addition of the resin to the reaction mixture is not critical to the practice of the present invention and the resin may be introduced into the reaction mixture all at once or in portions over time during the emulsion polymerization reaction.

The monomers employed in the emulsion polymerization are preferably added to the reaction mixture in two or more stages. Typically, a small amount of monomer is added to the mixture of water and surfactant with agitation. Thereafter the initiator is added to the reaction mixture followed by the addition of another portion of the monomer mix and the steric stabilizer. The polymerization reaction is then started. After the polymerization reaction has started, the low molecular weight resin is then added to the reaction mixture. After the addition of the resin, the balance of the monomer mix is added to the reactor and the emulsion polymerization reaction is allowed to go to completion.

Suitable low molecular weight support resins employed in the practice of the present invention include any solution or bulk polymerized polymers prepared from ethylenically unsaturated monomers such as olefins, mono vinylidene aromatics, alpha, beta-ethylenically unsaturated carboxylic acids and esters thereof and ethylenically unsaturated dicarboxylic anhydrides. They are known materials and are prepared employing standard solution polymerization techniques. Preferably, the support resins are prepared in accordance with the teachings of U.S. Pat. Nos. 4,414,370, 4,529,787 and 4,546,160 all of which are incorporated herein by reference.

Other suitable commercially available resins include water dispersed or water dispersible aliphatic polyurethanes Spensol L52 an aliphatic polyurethane with 30solids commercially available from Spencer Kellogg, and Upaco 2854, water dispersible polyurethane available from Upaco Adhesives, Inc., and water dispersible copolymers of ethylene with about 20% acrylic acid such as the primacors from Dow Chemical. specifically primacor 4990, a 34.2% aqueous dispersion of a copolymer of ethylene, and about 20% acrylic acid having a melt index of 1300 and primacor 4983, a 25% aqueous dispersion of a ; copolymer of ethylene and about 20% acrylic acid having a melt index of 300, Solid primacor resins are also available from Dow Chemical and can be dispersed in water and alkali. Suitable solid primacors include primacor 5990, Primacor 5980 and the like. The molecular weight of the primacor resins are less than about 20,000 number average. Also usable are water dispersible modified polyesters such as Eastman AQ55D molecular weight 18,000 available from Eastman Chemical Co. These and other similar resins can be used especially where the desirable characteristics of the resin, i.e.. flexibility, durability, etc., are required. These resins should be low molecular weight with a number average molecular weight of from about 1000 to 20,000, The support resin may be comprised of one or more Vinyl monomers, i.e., acrylic acid and esters and derivatives thereof, methacrylic acid and esters and derivatives thereof, styrene, alphamethyl styrene, vinyl toluene and the like, as well as ethylene, polyesters, urethanes and the like. The resin must be soluble or dispersible either in water or in an alkali solution. The molecular weight of the support resin should be in a range of from about 1,000 to about 20,000, and advantageously from about 5,000 to about 20,000 and preferably from about 5,000 to about 15,000. The percentage of total solids the support resins represents in the final emulsion is from about 10 to about 40% by weight and preferably from about 10 to about 25% by weight.

The acrylic polymer component of the present adhesive represents from about 60 to about 90% by weight of the total solids. The term "solids" when used herein, refers to the total weight of non-volatile components. The acrylic polymer emulsion of the present invention is a polymer comprising one or more vinylic monomers wherein at least about 40% by weight of the polymer is an alkyl acrylate or alkyl methacrylate monomer or mixtures of alkyl acrylate or alkyl methacrylate monomers having an alkyl group with from 2 to 20, and preferably 4 to 10, carbon atoms. Preferred alkylacrylate monomers include 2-ethylhexylacrylate (2-EHA) and butylacrylate (BA), isooctylacrylate (IOA), lauryl methacrylate (LMA), isodecylacrylate (IDA) or mixtures thereof.

The vinylic monomers employed in the acrylic emulsion polymer in addition to alkylacrylate can be any vinylic monomer. These vinylic monomers are copolymerized with the alkylacrylate to modify the properties of the resulting pressure sensitive adhesives according to the end-use applications and are readily determinable to one skilled in the art. Divinyl monomers can be used to increase the molecular weight and the internal strength of the polymer backbone and are generally employed in amounts less than about 7% by weight of the acrylic polymer. Suitable vinylic monomers employed in the practice of the present invention include styrene (ST). alpha methyl styrene (AMS), tetraethylene glycol diacrylate (TEGDA), hydroxyethyl methacrylate (HEMA), methylmethacrylate (MMA), ethylacrylate (EA), methylacrylate (MA), propylacrylates (PA), propylmethacrylates (PMA), hexylacrylates (HA), hexylmethacrylates (HMA), and vinyl acetate.

The total solids of the acrylic polymer emulsion can vary from about 30 to about 60 weight percent based on the total weight of the emulsion mixture. Advantageously, the total solids content is from about 30–58 and preferably 40–53% by weight.

In one method to prepare the adhesive compositions of the present invention, water and a sufficient amount of surfactant are added to a reactor under an inert atmosphere and brought to reaction temperature. The monomer mixture and the initiator are then co-fed into the reactor with agitation. The monomer mixture may be added all at once or, alternatively, it can be fed into the reactor over an extended period of time, i.e., 1–2 hours. After the initiator addition, a low molecular weight resin is then added to the reaction mixture during the polymerization process. The resin can be added to the reaction mixture as a solid or a solution. When the resin is added as a solid, an alkali such as aqueous $NH_4OH$ is added to the reaction mixture with the solid resin or after the addition of the solid resin. The time at which the support resin is added to the reaction mixture is not critical to the practice of the present invention, however, it is preferred that the reaction of the monomers be at least about 30%, preferably about 30% to 50%, complete before the resin is added to the reaction mixture. The support resin can be added immediately after the addition of the initiator and anytime up to an hour after the monomer mixture and initiator have been added to the reaction mixture.

In another method to prepare the adhesive compositions of the present invention, water and sufficient amount of surfactant are added to a reactor under an inert atmosphere and brought to reaction temperature. A minor portion (0.1–15% by weight) of the monomer mixture to be used in the emulsion polymerization reaction is added to the reactor followed by the addition of an initiator. A second portion (25–90 weight percent) of the monomer mixture is then added slowly over a 1 to 2 hour period to the reaction mixture. After the addition of this second portion of monomer, the support resin is added to the reaction mixture as either a solid or a solution. After the addition of the resin, a third portion (5–75 percent by weight) of the monomer mixture is added slowly to the reaction mixture over a ¼ to 1 hour period. If the support resin is added as a solid then aqueous alkali is simultaneously added to the reactor during the addition of the third portion of monomer mixture. The reaction is then held at reaction temperature with agitation for an additional 1 to 2 hour period.

In another method to prepare the adhesive compositions of the present invention, water and a sufficient amount of surfactant are added to a reactor under an inert atmosphere and brought to the reaction temperature. A minor portion (1/50–1/10) of the monomer mixture is added to the reactor followed by the addition of an initiator. The reaction is held for 5 minutes and then the balance of the monomer mixture is slowly added to the reactor over a 1 to 2 hour period. A support resin is then added to the reaction mixture anytime up to an hour after all of the monomer mixture has been added to the reactor. If the support resin is added as a solid, then a sufficient amount of alkali must be added to the reaction mixture to solubilize the solid resin. The reaction mixture is then held for an additional one to two hours at elevated temperature.

A fourth method of preparing the emulsion, similar to the above three methods, includes the co-feeding of a portion of the monomers along with the resin or low molecular weight polymers. All other conditions are similar.

For those methods where the resin and alkali are added with some of the monomers, the precharge should contain all of the monomers which will be solubilized by the alkali, i.e., acid containing monomers such as acrylic acid, if this is not done, the acid functional monomer may go into the aqueous phase and will not be available for reaction with the rest of the monomers which are not water soluble.

Once prepared, the present acrylic polymer emulsions can be used neat as pressure sensitive adhesives. Alternatively, other pressure sensitive adhesive ingredients can be added to the present acrylic polymer emulsions to provide a pressure sensitive adhesive with desired properties. These pressure sensitive adhesive ingredients include tackifiers, dyes, preservatives. leveling aids, coalescing solvents, perfumes, and the like. These optional ingredients are well known to one skilled in the art and are employed in concentrations readily determinable by one skilled in the art.

The PSA compositions of the present invention are used in any pressure sensitive adhesive application. Such applications include, tapes, stickers. labels; decals, decorative (especially wood grain) vinyls, laminates, wall coverings and floor tiles. The present acrylic polymer emulsion PSAs have substantially Newtonian-like flow characteristics and have desirable flow, coating and leveling characteristics on low energy surfaces. Additionally, the present acrylic polymer emulsion PSAs are useable on high speed equipment.

The following ingredients are admixed to prepare one preferred embodiment of the present invention:

| Ingredients | Weight % Range | Preferred |
|---|---|---|
| Support resin 80 Ethylene/20 AA $M_n$ 20,000 (Primacor 4983) | 0.5-2.5 | 11-20 |
| Ammonia | 0.4-4 | 0.75-2 |
| Nonionic surfactant | 0.1-2 | 0.25-0.75 |
| Initiator | 0.01-2 | 0.01-2 |
| Monomer mixture (at least 40% 2-EHA) | 14.25-57 | 35-50 |
| Water | Balance | Balance |

In another preferred embodiment, the support resin comprises a BA/AA/ST copolymer having an $M_n$ of between 2,000 and 2,500 and a BA/AA/ST weight ratio of about 70/15/15 or 25/15, respectively, and the acrylic polymer emulsion comprises at least 70 weight percent 2-EHA in combination with any one or more of the following monomers: BA, ST, AMS, MMA, HEMA and up to about 7 percent by weight MMA.

The following examples illustrate the practice of the present invention but should not be construed as limiting its scope. All percentages are by weight unless specified otherwise.

EXAMPLE 1

A polymer adhesive composition having the following formulation was prepared:

Part A 329.1 grams deionized water; 12 grams sodium tridecyl ether sulfonate (Sipex EST—30% actives); 3.6 grams octylphenol ethoxylate —10 moles ethylene oxide (Triton X-100).

Part B 0.5 grams acrylic acid; 1.4 grams methylmethacrylate; 8.7 grams butylacrylate; 2.9 gram 2-ethylhexylacrylate.

Part C 2.5 grams ammonium persulfate; 20 grams deionized water.

Part D 10.3 grams acrylic acid; 25.6 grams methylmethacrylate; 165.5 grams butylacrylate; 55.2 grams 2-ethylhexylacrylate.

Part E 57.1 gram deionized water;

Part F 10 grams ammonium hydroxide; 50 grams deionized water;

Part G 180 grams primacor 4983 (a 25% aqueous dispersion with ammonia of copolymer of ethylene with about 20% acrylic acid $M_n$ approximately 20,000 —Dow Chemical Company).

Part H 18 grams methylmethacrylate: 7.2 grams hydroxyethyl methacrylate; 116.1 grams butylacrylate; 38.7 grams 2-ethylhexylacrylate.

The emulsion is prepared by mixing Parts A and B in a reaction vessel which has been purged with nitrogen and is stirred at approximately 200-250 rpm and heated to 80° C. Part C is then added, followed in 5 minutes by the beginning of the Part D primary feed. Part D is fed over a period of 50 minutes. After ¼ of the Part D feed is in, add Part E. Approximately 15 minutes after the feed of Part D is completed, add Part F over 10 minutes. Immediately after Part F is added, add Part G over a period of approximately 20 minutes, and add Part H over a period of 40 minutes. After all of Part H is in, the material is held for approximately 1 hour at 80° C., cooled and filtered.

The above emulsion has a pH in the range of 8.5-9 and with a non-volatile content of 44-47% by weight and a viscosity of 300-500 centipoise. Generally, the particle size is very fine with no trash particles over 25 microns and very few visible under 25 microns. When it is preferred to have adhesive properties the above emulsion is performed as follows.

The peel tests were performed by pressure Sensitive Tape Council Test PSTC-1 with a residence time, and temperature, as shown in Table I.

TABLE I

| | PEEL TEST | | |
|---|---|---|---|
| | Cure Time | Residence Time | Rating |
| Run A | 24 hours | 30 minutes | 4.7 pli A |
| Run B | 24 hours | 24 hours | 7.5 pli A |
| Run C | 1 week | 30 minutes | 6.0 pli A |
| Run D | 1 week | 24 hours | 6.0 pli A |
| Run E | 24 hours | 1 week* | 8.2 pli C + A |
| Run F | 1 week* | 30 minutes | 3.5 pli A |

*All cure times and residence times were run at room temperature except for those marked with an "*" which were run at 70° C.

The probe tack test was performed as follows: polyken probe Tack (A-1-1) using polyken probe Tack tester from TMI Inc. The Loop Tack Test was performed on an Instron Tensile Tester using a 5" loop of 1" wide tape allowed to contact a stainless steel plate until 1 square inch of tape is on the plate and immediately withdrawn at rate of 12"/minute. Probe Tack 24 hour cure: 648 grams; Tack 1 week Cure 661 grams; probe Tack 1 week cure at 70° C.: 622 grams; Loop Tack 1 week cure: 2.5 pounds.

The shear tests were performed as follows: PSTC-7 with the following configuration: ½ by 1 inch contact area with a 1 kg. weight, the long axis orientation was parallel to the applied stress. The results were as follows: 24 hour cure-272 minutes; 1 week cure-325 minutes; 1 week cure at 70° C-greater than 10,000 minutes with no slip.

EXAMPLE 2

The emulsion of Example 2 is prepared by mixing Parts A and B in a reaction vessel which has been purged with nitrogen and is stirred at approximately 200-250 rpm and heated to 80 ° C. Part C is then added, followed in 5 minutes by the beginning of the Part D primary feed. Part D is fed over a period of 50 minutes. After ¼ of the Part D feed is in, add Part E. Approximately 15 minutes after the feed of Part D is completed, add Parts H & I over 10 minutes. Immediately after Parts H & I are added, add Part F over, a period of approximately 20 minutes, and add Part G over a period of 40 minutes. After all of Part G is in, the material is held for approximately 1 hour at 80° C., cooled and filtered.

Part A 324.2 grams water, 18 grams Sipex EST, 9.0 grams Triton X-100.

Part B 2.7 grams styrene, 1.6 grams methacrylic acid; 2.7 grams butylacrylate; 20 grams 2-ethylhexylacrylate.

Part C 2.5 grams ammonium persulfate; 20 grams water.

Part D 24.3 grams styrene, 14.6 grams methacrylic acid; 23 grams butylacrylate, 179.8 grams 2-ethylhexylacrylate.

Part E 57.1 grams deionized water.

Part F 157.5 grams of a resin having a monomer content of 15% styrene. 15% acrylic acid, 70% butylacrylate. a weight average molecular weight of 4,140 and a number average molecular weight 410 prepared using the process of U.S. Pat. No. 4,529,787.

Part G 18 grams styrene, 18 grams butylacrylate, 144 grams 2-ethylhexylacrylate.

Part H 94 grams of water.

Part I 15 grams NH4OH.

When tested for peel, shear and tack, the above emulsion gave adequate pressure sensitive adhesive properties.

EXAMPLE 3

Using the procedures of EXAMPLE 1, a pressure-sensitive adhesive emulsion having the following formulation was prepared.

Part A 324.1 grams water, 12 grams Sipex EST, 3.6 grams Triton X-100.

Part B 0.5 grams acrylic acid, 2.7 grams vinyl acetate, 7.7 grams butylacrylate, 2.6 grams 2-ethylhexylacrylate, 0.04 grams ditertiary butyl peroxide.

Part C 2.5 grams ammonium persulfate, 20 grams deionized water.

Part D 10.3 grams acrylic acid, 51.3 grams vinyl acetate, 146.2 grams butylacrylate. 48.7 grams 2-ethylhexylacrylate, 0.66 grams ditertiary butyl peroxide.

Part E 57.1 grams deionized water.

Part F 10 grams NH4OH, 50 grams deionized water.

Part G 161 grams Eastman AQ55D, a low molecular weight modified polyester resin available from Eastman Chemical Company molecular weight of 18,000.

Part H 99.6 grams butylacrylate, 34.2 grams 2-ethylhexylacrylate, 7.2 grams hydroxyethyl acrylate, 46 grams vinylacetate.

When tested as in EXAMPLE 1, the above resin had good pressure sensitive adhesive properties.

Comparative Examples

Utilizing a conventional emulsion-polymerization reactor equipped with, among other things, (1) means for adding ingredients into the reactor, (2) means for agitating the reactor contents, (3) means for heating the agitated reactor contents, and (4) means for measuring the temperature of the agitated reactor contents, the following comparative examples, each a polymeric emulsion, were prepared.

EXAMPLE 4

A polymeric resin was produced in accordance with the disclosure of Okamoto et al., as set forth in Japanese Pat. Document No. 47(1972)-606.

The procedure for preparing such a polymeric resin as well as the relative amounts of ingredients utilized to do so are set forth below. All "parts" are parts-by-weight, unless otherwise indicated.

RESIN-PRODUCTION PROCEDURE AND RELATIVE INGREDIENT AMOUNTS

Part J 1200 parts deionized water and 600 parts isopropyl alcohol.

Part K 195 parts acrylic acid monomer, 105 parts styrene monomer, and 1.2 parts Vazo 64 brand (generically known as azo-bis-isobutyronitrile) initiator.

Step 1

Part J was added to a 3-liter reaction flask having appropriate attachments for running the desired reaction. Agitation of the reactor contents as well as nitrogen flow to the reactor was started.

Step 2

After the Vazo 64 brand initiator was dissolved in the monomers identified in Part K, the Part K ingredients were added to the agitated reaction flask.

Step 3

Heat was controllably applied to the reaction flask to obtain a reaction temperature of 65? C. This temperature was maintained for 7 hours,

Step 4

After the agitated, reaction flask contents had been heated for 7 hours at 65° C., the temperature was increased to 80° C. for one additional hour.

Step 5

Following Step 4, the heat to the reaction flask was further increased to begin azeotroping off the isopropyl alcohol as well as any unreacted monomer. The distillate started coming off at 85° C. and was stopped at 95° C. 740 grams of distillate were recovered.

Step 6

Thereafter, the reaction flask was cooled to 80° C. and 162 grams of 28% ammonium hydroxide was added to the agitated reaction flask contents. The resultant mixture was allowed to mix for 1 hour.

Step 7

The mixture was then cooled to 25° C. and thereafter filtered.

The thus-produced polymeric resin solution was utilized, in the following comparative examples, for purposes of attempting to produce acceptable pressure-sensitive adhesives.

PRESSURE-SENSITIVE EMULSION SYNTHESIS

Part L 90 parts of the above resin solution was utilized.

Part M 195.8 parts deionized water, 5.4 parts sodium tridecyl ether sulfate, and 1.6 parts 9-mole ethoxylated octylphenol (the latter two being surfactants) were combined.

Part N 10 parts deionized water and 1.13 parts ammonium persulfate were combined.

Part 0 5.1 parts acrylic acid (stabilizer), 818 parts n-butyl acrylate, and 14.4 parts ethyl acrylate (the latter two being monomers) were combined.

Part P 2.3 parts 28% ammonium hydroxide.

Part Q 86.1 parts n-butyl acrylate and 15.2 parts ethyl acrylate were combined.

Step 1

A 1-liter reaction flask having the appropriate attachments was charged with Part M, and heated to 80° C. under a nitrogen flow at 200 RPM agitation. These conditions were maintained throughout the reaction.

Step 2

5.1 parts of part 0 were added to the reaction flask.

Step 3

The reaction flask contents were mixed for 5 minutes.

Step 4

Part N was added to the reaction flask.

Step 5

The reaction flask contents were mixed for 20 minutes.

Step 6

The remainder of Part 0 was fed into the reaction flask at a constant rate over 40 minutes.

Step 7

The reaction flask contents were then mixed for an additional 10 minutes.

Step 8

Part P was then added to the reaction flask.

Step 9

At a constant rate, a 35-minute feed of Part L was fed into the reaction flask. At the same time, a separate feed of Part Q was started at a constant rate over 1 hour.

Step 10

The reaction flask contents were then further mixed for 1 additional hour.

Step 11

The reaction flask contents were thereafter cooled to 25° C. and the finished product was removed from the reaction flask.

EXAMPLE 5

An aliquot of the Example 4 resin was used as "Part L" of the "Emulsion Synthesis" procedure for the production of the emulsion of Example 5, and "Part 0" of the "Emulsion Synthesis" procedure was changed (from what is set out above in Example 4) so as to consist of only 86.1 parts n-butyl acrylate and 15.2 parts ethyl acrylate.

The emulsion produced in accordance with Example 5 thus contained no stabilizer.

EXAMPLE 6

An aliquot of the Example 4 resin was used as "Part L" of the "Emulsion Synthesis" procedure for the production of the emulsion of Example 6; and "Part M" of the "Emulsion Synthesis" procedure was changed (from what is set out above in Example 4) so as to consist of only 195.8 parts deionized water and "Part 0" of the "Emulsion Synthesis" procedure was changed so as to consist of only 86.1 parts n-butyl acrylate and 15.2 parts ethyl acrylate.

The emulsion produced in accordance with Example 6 thus contained neither surfactant nor stabilizer.

TESTING OF ADHESIVE PROPERTIES

After the thus-produced emulsions of each of Examples 4-6 was filtered, the adhesive properties of each such emulsion was then determined as follows.

Adhesive-Testing procedure

A small sample of each such emulsion was placed at the top of a 2-mil thick polyethylene terephthalate (pET) sheet. The PET sheet measured 8"x 11". The sample was then spread over the sheet using a # wire wound rod. The thus-spread sample was then placed in a 120° C. oven for 5 minutes to dry. After the sample was removed from the oven and allowed to cool, a sheet of "Mead R-Coat" brand release liner was placed over the thus-dried emulsion film, thereby forming a construction for further testing. Such a "construction" is hereinafter referred to as a "tape". Test samples that were one-inch wide were then cut from the tape for use in the adhesive-testing procedures, PSTC-1 and Polyken Probe Tacks.

| Comparative Examples | PSTC-1 Values | Tack Values |
|---|---|---|
| 4 | 6.6 A | 88 |
| 5 | 1.7 A | 50 |
| 6 | 1.7 C | 96 |

The PSTC-1 values are expressed in ounces per linear inch and the tack values are expressed in grams per square centimeter. Values expressed in ounces per linear inch can b ®converted into pounds per linear inch (pli) by dividing by 16.

The values listed above for the emulsion of Example 4 would indicate that it could be used as a removable pressure-sensitive adhesive (PSA). That is, it removes cleanly, leaving no residue behind (hence the "A" designation following the PSTC-1 numerical value, indicating adhesive failure).

The adhesive values of the emulsion of Example 5, on the other hand, are so low as to indicate that the emulsion of Example 5 could not be utilized as an acceptable PSA. The tape had difficulty adhering to the test panel.

While certain adhesive values of the emulsion of Example 6 appear to indicate high tack, the very low peel strength value (PSTC-1) coupled with a cohesive failure mode (i.e., the "C" designation following the PSTC-1 numerical value) renders it unacceptable as a PSA. Because the peel values of the emulsion of Example 6 possessed so low a cohesive failure value, the film did not possess any internal integrity. Such a film has no presently acceptable application as a PSA.

What has been described herein are novel pressure-sensitive adhesives as well as methods for the production thereof. While the present invention has been described with reference to preferred embodiments, the present invention is not limited thereto. On the contrary, alternatives, changes or modifications may become apparent to those skilled in the art upon reading the foregoing description. Accordingly, such alternatives, changes and modifications are to be considered as forming a part of the invention insofar as they fall within the spirit and scope of the appended claims.

What I claim is:

1. A method for preparing a reaction mixture which contains an aqueous pressure-sensitive adhesive composition, utilizing an emulsion-polymerization reaction, wherein emulsion particles form upon initiation of the emulsion-polymerization reaction, the method comprising the steps of:
   combining, in a reactor, initial-feed ingredients comprising water and an emulsion-polymerization surfactant;
   agitating the reactor contents and subjecting the reactor contents to an inert atmosphere;
   heating the agitated reactor contents to a predetermined reaction temperature;
   adding into the agitated reactor monomer-feed ingredients comprising an emulsion-polymerizable monomer mixture and an effective amount of an initiator for initiating the emulsion-polymerization reaction, wherein either the initial-feed ingredients or the monomer-feed ingredients further comprise an effective amount of a stabilizer for preventing coagulation of the emulsion particles; and
   adding to the agitated reactor, prior to completion of the emulsion-polymerization reaction, an effective amount of a polymeric resin, soluble or dispersible in water or in alkali, and having a number average molecular weight of about 1,000 to about 20,000, for producing in the reactor a reaction mixture containing an aqueous pressure-sensitive adhesive composition having an adhesive value of at least 6.6 ounces per linear inch.

2. The method in accordance with claim 1 wherein the stabilizer is selected from the group consisting of a functional monomer and an ethoxylated alkylphenol having at least 20 ethylene oxide units.

3. The method in accordance with claim 2 wherein the ethoxylated alkylphenol having at least 20 ethylene oxide units is selected from the group consisting of nonylphenol and octylphenol.

4. The method in accordance with claim 2 wherein the functional monomer is selected from the group consisting of acrylic acid, methacrylic acid, and polyethylene glycol monomethacrylate.

5. The method in accordance with claim 1 wherein the stabilizer is present in an amount of about 1 to about 8 percent, based on the weight of the reaction mixture.

6. The method in accordance with claim 5 wherein the stabilizer is present in an amount of about 2 to about 4 weight percent.

7. The method in accordance with claim 1 wherein the emulsion-polymerization surfactant is selected from the group consisting of a nonionic ethoxylated alkylphenol having 15 or less moles of ethylene oxide, an ethylene oxide/propylene oxide block copolymer having less than about 3.5 moles of ethylene oxide and propylene oxide combined, a sodium tridecyl ether sulfonate, and mixtures thereof.

8. The method in accordance with claim 7 wherein the emulsion-polymerization surfactant is present in an amount of about 0.25 to about 5 percent, based on the weight of the reaction mixture.

9. The method in accordance with claim 8 wherein the emulsion-polymerization surfactant is present in an amount of up to about 1 percent, based on the weight of the reaction mixture.

10. The method in accordance with claim 1 wherein the inert atmosphere is nitrogen.

11. The method in accordance with claim 1 wherein the reaction temperature is about 60 to about 100° C.

12. The method in accordance with claim 1 wherein the emulsion-polymerizable monomer mixture comprises 2-ethylhexyl acrylate, butyl acrylate, isooctyl acrylate, lauryl methacrylate, isodecyl acrylate, and mixtures thereof.

13. The method in accordance with claim 1 wherein the emulsion-polymerizable monomer mixture comprises at least one vinylic monomer and divinyl monomers.

14. The method in accordance with claim 1 wherein the emulsion-polymerizable monomer mixture is selected from the group consisting of styrene, alpha-methyl styrene, tetraethylene glycol diacrylate, hydroxyethyl methacrylate, methyl methacrylate, ethyl acrylate, methyl acrylate, propyl acrylate, propyl methacrylate, hexyl acrylate, hexyl methacrylate, vinyl acetate, and combinations thereof.

15. The method in accordance with claim 2 wherein the emulsion-polymerizable monomer mixture comprises methyl methacrylate, butyl acrylate, and 2-ethylhexyl acrylate, and wherein the functional monomer comprises acrylic acid.

16. The method in accordance with claim 2 wherein the emulsion-polymerizable monomer mixture comprises styrene, butyl acrylate, and 2-ethylhexyl acrylate.

17. The method in accordance with claim 16 wherein the functional monomer comprises methacrylic acid.

18. The method in accordance with claim 1 wherein the polymeric resin is either prepared from preselected ethylenically-unsaturated monomers, or said polymeric resin is selected from the group consisting of water-dispersed or water-dispersible aliphatic polyurethanes, water-dispersible copolymers of ethylene and acrylic acid, and water-dispersible polyesters.

19. The method in accordance with claim 18 wherein the ethylenically-unsaturated monomers are selected from the group consisting of olefins, monovinylidene aromatics, alpha,beta-ethylenically unsaturated carboxylic acids and esters thereof, and ethylenically-unsaturated dicarboxylic anhydrides.

20. The method in accordance with claim 1 wherein the polymeric resin is prepared from a monomer selected from the group consisting of at least one vinyl monomer, an ethylene monomer, an ester monomer, a urethane monomer, and combinations thereof.

21. The method in accordance with claim 20 wherein the vinyl monomer utilized to prepare the polymeric resin is selected from the group consisting of acrylic acid including esters and derivatives thereof, methacrylic acid including esters and derivatives thereof, styrene, alpha-methyl styrene, vinyl toluene, and combinations thereof.

22. The method in accordance with claim 1 wherein the polymeric resin is made from ethylene and acrylic acid and has a number average molecular weight of about 20,000.

23. The method in accordance with claim 1 wherein the polymeric resin is a butyl acrylate/acrylic acid/styrene copolymer.

24. The method in accordance with claim 23 wherein said copolymer has a number average molecular weight of about 2,000 to about 2,500.

25. The method in accordance with claim 24 wherein said copolymer has a butyl acrylate/acrylic acid/styrene weight ratio of about 70/15/15.

26. The method in accordance with claim 24 wherein said copolymer has a butyl acrylate/acrylic acid/styrene weight ratio of about 60/25/15.

27. The method in accordance with claim 1 wherein the polymeric resin is added to the agitated reactor when the emulsion-polymerization reaction is about 30 percent to about 50 percent complete.

28. The aqueous pressure-sensitive adhesive composition made in accordance with the method of claim 1.

29. A method for preparing a reaction mixture which contains an aqueous pressure-sensitive adhesive composition, utilizing an emulsion-polymerization reaction, wherein emulsion particles form upon initiation of the emulsion-polymerization reaction, the method comprising the steps of:
  combining, in a reactor, initial-feed ingredients comprising water and an emulsion-polymerization surfactant;
  agitating the reactor contents and subjecting the reactor contents to an inert atmosphere;
  heating the agitated reactor contents to a predetermined reaction temperature;
  preparing monomer-feed ingredients comprising a first emulsion-polymerizable monomer mixture and a second emulsion-polymerizable monomer mixture, wherein either the initial-feed ingredients or one of the first and second monomer mixtures or both the initial-feed ingredients and said one of the first and second monomer mixtures further comprise an effective amount of a stabilizer for preventing coagulation of the emulsion particles;
  adding to the agitated reactor a minor portion of said one of the first and second emulsion-polymerizable monomer mixtures;
  adding to the agitated reactor an effective amount of an initiator for initiating the emulsion-polymerization reaction;
  adding to the agitated reactor, over a predetermined time period, the remainder of said one of the first and second emulsion-polymerizable monomer mixtures;
  adding to the agitated reactor an effective amount of a polymeric resin, soluble or dispersible in water or in alkali, and having a number average molecular weight of about 1,000 to about 20,000;
  adding to the agitated reactor, over a predetermined time period, the other of the first and second emulsion-polymerizable monomer mixtures; and
  maintaining the agitated reactor contents at the reaction temperature for a predetermined time period, for producing in the reactor a reaction mixture containing an aqueous pressure-sensitive adhesive composition having an adhesive value of at least 6.6 ounces per linear inch.

30. The aqueous pressure-sensitive adhesive composition made in accordance with the method of claim 29.

31. A method for preparing a reaction mixture which contains an aqueous pressure-sensitive adhesive composition, utilizing an emulsion-polymerization reaction, wherein emulsion particles form upon initiation of the emulsion polymerization reaction, the method comprising the steps of:
  combining, in a reactor, initial-feed ingredients comprising water and an emulsion-polymerization surfactant;

agitating the reactor contents and subjecting the reactor contents to an inert atmosphere;

heating the agitated reactor contents to a predetermined reaction temperature;

adding to the agitated reactor a minor portion of monomer-feed ingredients comprising an emulsion-polymerizable monomer mixture, wherein either the initial-feed ingredients or the monomer-feed ingredients or both the initial-feed ingredients and the monomer-feed ingredients further comprise an effective amount of a stabilizer for preventing coagulation of the emulsion particles;

adding to the agitated reactor an effective amount of an initiator for initiating the emulsion-polymerization reaction;

adding to the agitated reactor, over a predetermined time period, the remainder of the emulsion-polymerizable monomer mixture;

adding to the agitated reactor, prior to completion of the emulsion-polymerization reaction, an effective amount of a polymeric resin, soluble or dispersible in water or in alkali, wherein the number average molecular weight of the polymeric resin is about 1,000 to about 20,000; and maintaining the agitated reactor contents at the reaction temperature for a predetermined time period, for producing in the reactor a reaction mixture containing an aqueous pressure-sensitive adhesive composition having an adhesive value of at least 6.6 ounces per linear inch.

32. The aqueous pressure-sensitive adhesive composition made in accordance with the method of claim 31.

33. The method in accordance with claim 1 wherein the polymeric resin is co-fed into the agitated reactor along with a portion of the emulsion-polymerizable monomer mixture.

34. The method in accordance with claim 29 wherein at least a portion of the polymeric resin is co-fed into the agitated reactor along with at least a portion of said other of the first and second emulsion-polymerizable monomer mixtures.

35. The method in accordance with claim 31 wherein at least a portion of the polymeric resin is co-fed into the agitated reactor along with at least a portion of the remainder of the monomer-feed ingredients.

36. The method in accordance with claim 29 wherein the monomeric makeup of the first emulsion-polymerizable monomer mixture is different from the monomeric makeup of the second emulsion-polymerizable monomer mixture.

37. The aqueous pressure-sensitive adhesive composition made in accordance with the method of claim 36.

* * * * *

UNITED STATES PATENT AND TRADEMARK OFFICE
CERTIFICATE OF CORRECTION

PATENT NO. :   4,879,333

DATED      :   November 7, 1989

INVENTOR(S):   Glenn R. Frazee

It is certified that error appears in the above-identified patent and that said Letters Patent is hereby corrected as shown below:

At column 5, line 6, please delete the semicolon [;] appearing before the word "copolymer".

At column 5, line 7, after the number "300", please substitute the comma [,] with a period [.].

At column 5, line 17, please substitute the abbreviation "i.e.." with -- i.e., --.

At column 5, line 20, please substitute "20,000," with -- 20,000. --.

At column 11, line 20, please substitute "65?" with -- 65° --.

At column 11, line 65, please substitute "Part" with -- Part 0 --.

At column 11, line 66, please substitute "0 5.1" with -- 5.1 --.

At column 12, line 16, please substitute "part 0" with -- Part 0 --.

At column 12, line 29, please substitute "Part 0" with -- Part 0 --.

At column 13, line 17, please substitute "(pET)" with -- (PET) --.

UNITED STATES PATENT AND TRADEMARK OFFICE
CERTIFICATE OF CORRECTION

PATENT NO. : 4,879,333

DATED : November 7, 1989

INVENTOR(S) : Glenn R. Frazee

It is certified that error appears in the above-identified patent and that said Letters Patent is hereby corrected as shown below:

At column 13, line 39, please substitute "b®converted" with -- be converted --.

Signed and Sealed this

Third Day of December, 1991

Attest:

HARRY F. MANBECK, JR.

*Attesting Officer*          *Commissioner of Patents and Trademarks*